UNITED STATES PATENT OFFICE.

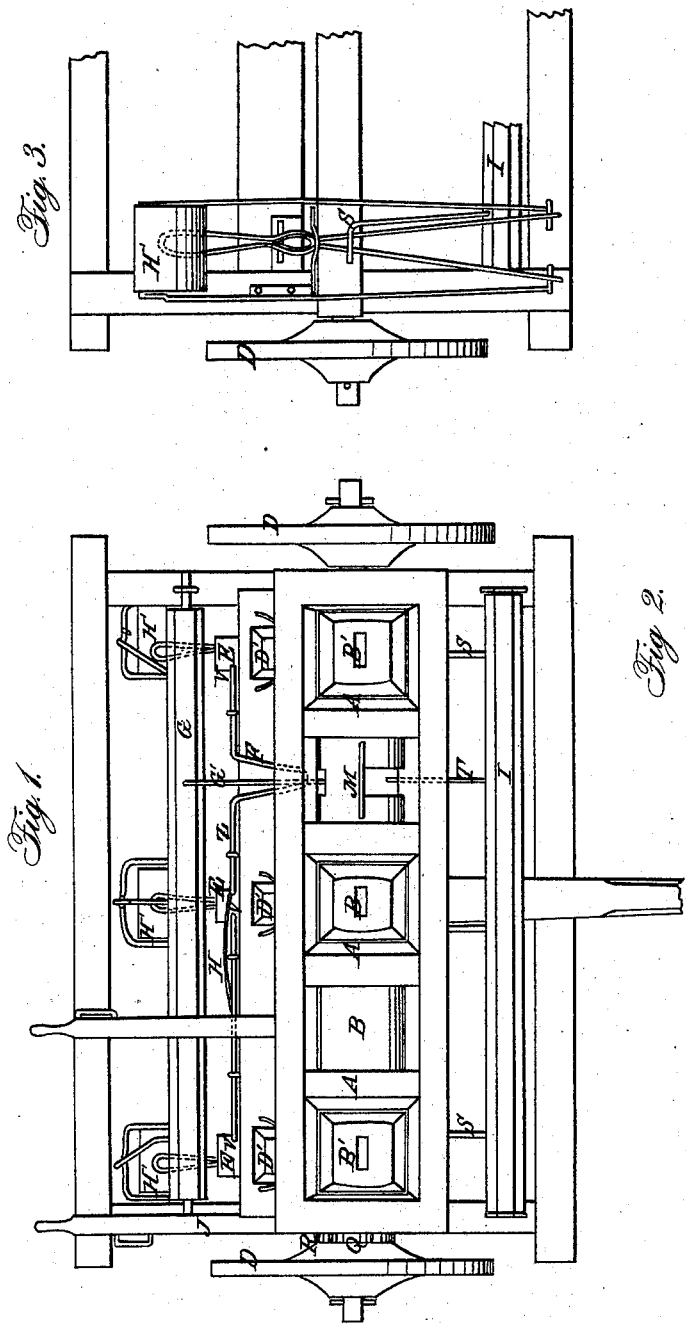

JOHN COOLEY, OF TAFTON, WISCONSIN.

IMPROVEMENT IN CORN-PLANTERS.

Specification forming part of Letters Patent No. 31,700, dated March 19, 1861.

*To all whom it may concern:*

Be it known that I, JOHN COOLEY, of Tafton, in the county of Grant and State of Wisconsin, have invented a new and useful Improvement in Seed-Planters; and I do hereby declare that the following is a full, clear, and exact description of the same, reference being had to the accompanying drawings, forming a part of this specification, in which—

Figure 1 represents a top view, Fig. 2 a vertical longitudinal section, and Fig. 3 part of a bottom view, of this seed-planter.

Similar letters of reference in each of the several figures indicate corresponding parts.

The nature of my invention consists in the cam-projections and recesses of the seed-distributing cylinder, in combination with the crank-shaft of the feed-valves, the rock-shaft, the hinged pressure-rollers, and the levers operating the hinged shoes, all constructed as and for the purposes described.

To enable others skilled in the art to make and use my invention, I will proceed to describe its construction and operation.

This seed-planter rests on two wheels, D D. A cog-wheel, R, on the wheel-shaft takes into a pinion, Q, at one end of a cylinder, B, extending the whole width of the seed-planter. This end of the cylinder-axle has its bearing in a lever, J, while the other end has its bearing in the frame of the machine. By lifting the outer end of this lever J the pinion Q can be lifted out of gear, so as to stop the motion of the cylinder and the distribution of the seed.

The distribution of the seed is performed by recesses or cups B' in the surface of the cylinder, which are filled with seed from hoppers A, the upper half of the cylinder fitting into the open bottom of the hoppers. As the filled cups pass from underneath the hoppers they drop the seed into the seed-boxes D', arranged underneath the cylinder. The bottom of each of these boxes D' is alternately opened and closed by valves E, so as to drop the seed through guide-tube L and shoe K in hills on the ground. The shoe is intended to protect the tube L from being clogged by the loose earth with which it might come in contact. The shoe itself is kept clean by being lifted as soon as the seed has been dropped, in a manner hereinafter to be described, when it comes in contact with the edge U', which scrapes off any earth which may stick to the shoe. As soon as the seed has been dropped, and as the machine moves along, the rollers H'—one behind each shoe—are made to descend, as will be described hereinafter, so as to press the earth together over the seed. The rollers are then again raised, so as not to create unnecessary resistance to the forward motion of the machine.

The above-described relative motion of the valves, shoes, and rollers is imparted by means of cam-projections M and recesses O of the cylinder B. The rollers H' have their bearings in frames Y, hinged in front of the machine at V. The rear ends of the frames Y, supporting the rollers, are hung to the outer end of arms N of a rock-shaft, G. Another arm, G, extends from the rock-shaft forward, and as the cylinder revolves and the cam-projection M strikes the end of arm G the rock-shaft is turned on its axis so as to elevate the rear ends of the arms N, and thus raise the rollers. As soon as the cam-projection slips off the end of arm G' the latter slips into the recess O, and thus allows the rock-shaft to return into its former position and the rollers to descend and rest against the ground, marking the position of each sill. As the cylinder continues its revolution the cam-projection M strikes the crank-arm F, extending from a shaft, Z, and causes the shaft Z to make part of a revolution until the cam releases the crank-arm and allows the shaft to return in obedience to the pressure of a spring, H. As the shaft turns partially on its axis cranks U, extending from said shaft, move the valves E backward, so as to open the bottom of each seed-box D' and drop the seed. The open shoes K are secured to the rear ends of bars W, the front ends of which are hung to the frame of the machine at V. A rock-shaft, I, has arms S extending under the bars W near the shoes K. As the cylinder continues its revolution the cam-projection M strikes the end of a lever, T, extending from the rock-shaft I, and causes the shaft to make part of a revolution until the cam-projection liberates the end of the lever T. During this partial revolution of the shaft I the arms S raise the rear ends of the bars W. As the shoes K are raised, together with the bars W, they come in contact with the edge U', for the purpose above set forth.

I also propose to apply shoes in front of each of the wheels of the machine to clear the track of the wheels.

What I claim as my invention, and desire to secure by Letters Patent, is—

The cam-projections M and recesses O of the seed-distributing cylinder B, in combination with the crank-shaft Z U F of the seed-valves E, the rock-shaft G, the hinged pressure-rollers H', and the levers T S, operating the hinged shoes K, substantially as and for the purposes set forth.

JOHN COOLEY.

Witnesses:
    DANIEL GRIFFITH,
    L. J. WOOLLEY.